March 2, 1954    A. W. BLANCHARD    2,671,179
INDUCTION GENERATOR
Filed Aug. 24, 1951
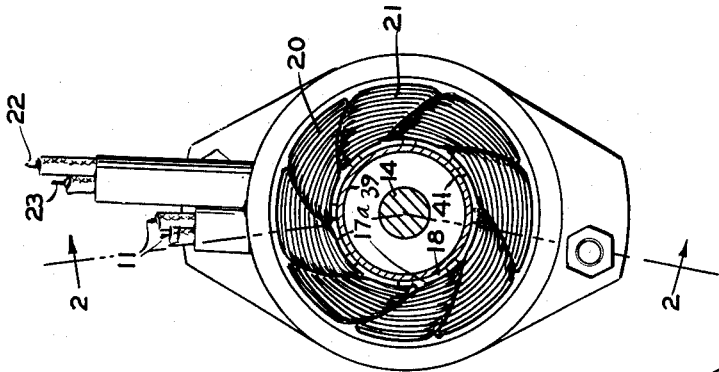
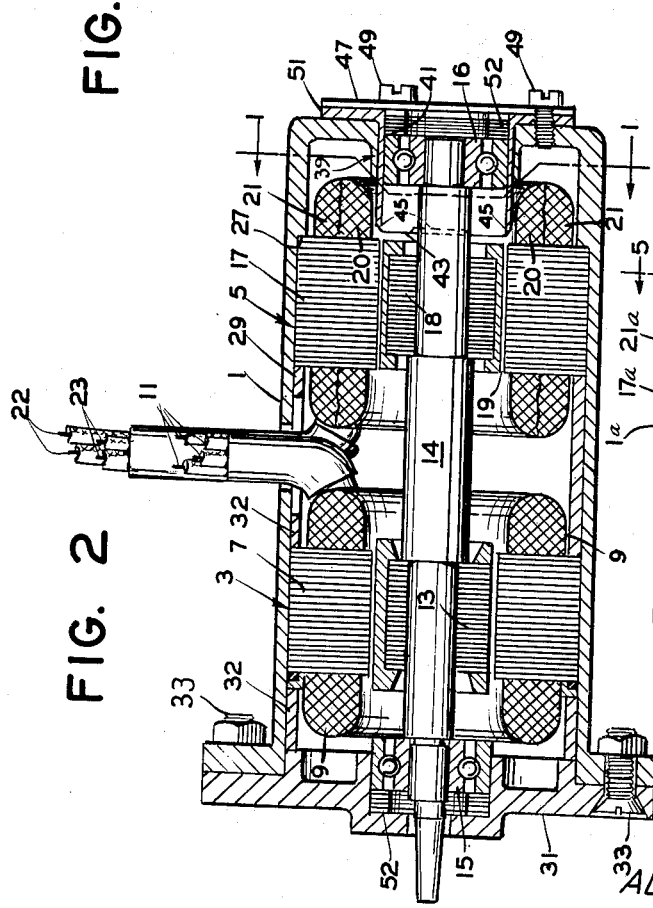
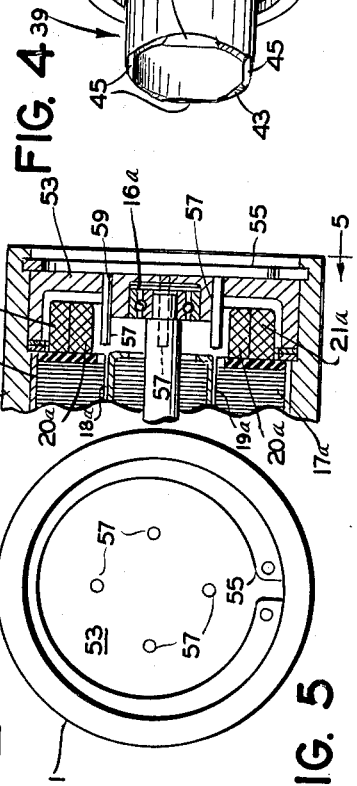
INVENTOR.
ALLEN W. BLANCHARD
BY
ATTORNEY Patented Mar. 2, 1954

2,671,179

UNITED STATES PATENT OFFICE 2,671,179

INDUCTION GENERATOR

Allen W. Blanchard, Allendale, N. J., assignor to Bendix Aviation Corporation, Teterboro, N. J., a corporation of Delaware Application August 24, 1951, Serial No. 243,459

14 Claims. (Cl. 310—171)

The invention relates to induction generators and more particularly to rate generators of the kind used in servo systems and computers.

A servo system using a rate generator is shown and described in Riggs Patent No. 2,115,086 issued April 26, 1938. The rate generator is driven by a servo motor and provides a voltage corresponding to the speed of the motor which is combined with a signal from a controller and applied to an amplifier to control the motor. The voltage from the rate generator avoids hunting of the motor.

Rate generators also are used as tachometer or speed indicating devices in computer systems where the desired result is a function of the speed and/or acceleration of the motor driving the generator.

Rate generators of the kind described usually provide a residual voltage when the generator is at rest because of asymmetrical end turn leakage flux and fringe flux at the end of the air gap between the rotor and stator. In a servo system, this residual voltage may drive the servo motor from null position and cause saturation in a servo amplifier so that the amplifier becomes insensitive to signals from the controller. In a computer system, the residual voltage provides a speed signal when the motor is at rest. Obviously, such residual voltages are undesirable.

One arrangement for eliminating residual voltage is described and claimed in copending application Serial No. 243,561, filed the same day as the present application by Israel E. Goldberg and assigned to the same assignee as the present application. In that arrangement a single rod-like element extends close to the windings on the core of the stator and the end of the element is positioned adjacent the air gap between the rotor and stator. The end turn leakage flux from the windings and the fringe flux at the end of the air gap is modified to substantially eliminate residual voltage induced in the windings when the rotor is at rest. When the core includes a plurality of poles, the flux pattern adjacent one of the poles is modified without appreciably modifying the flux pattern adjacent the other poles and the flux pattern in some instances may be distorted appreciably adjacent the element.

The main object of the present invention is to modify the flux adjacent each of the poles uniformly and thereby substantially eliminate residual voltage induced in the stator windings when the rotor is at rest.

The invention contemplates a generator having a stator including a core with windings thereon and having a plurality of poles, a rotor rotatable relative to the stator and closely associated with the poles, and an element of magnetically permeable material having portions of non-uniform cross section equally spaced angularly from one another positioned adjacent the core and corresponding in number to the number of poles.

The element is positioned relative to the core and windings to modify the leakage flux from the end turns of the windings and the fringe flux at the end of the air gap between the core and rotor to substantially eliminate residual voltage induced in the windings when the rotor is at rest. The invention also contemplates adjusting the rotor axially relative to the stator until the residual voltage is a minimum.

The foregoing and other objects and advantages of the invention will appear more fully hereinafter from a consideration of the detailed description which follows, taken together with the accompanying drawing wherein two embodiments of the invention are illustrated. It is to be expressely understood, however, that the drawing is for the purposes of illustration and description only, and is not intended as a definition of the limits of the invention.

In the drawing:

Figure 1 is a transverse vertical section taken approximately on the line 1—1 of Figure 2 of a generator unit constructed according to the invention;

Figure 2 is a longitudinal vertical section taken approximately on the line 2—2 of Figure 1 through the axis of the unit;

Figure 3 is a perspective view of the device for modifying the flux uniformly adjacent each of the poles;

Figure 4 is a transverse vertical section corresponding to Figure 2 and shows another form of the invention; and, Figure 5 is an end view of the structure shown in Figure 4.

Referring now to the drawing for a more detailed description of the generator unit of the present invention, the unit shown in Figures 1 and 2 comprises a housing 1 enclosing a motor 3 drivably connected to an induction generator 5. The motor comprises a core 7 of laminated material having windings 9 surrounding the core and having terminals 11 adapted for connection to the output of an amplifier or other suitable power source for energizing the windings. A rotor 13 is fixed to a shaft 14 rotatably supported in bearings 15, 16 in housing 1. While an electric motor is shown driving the generator, it should be understood that any other suitable driving means may be used.

Generator 5 is positioned in housing 1 adjacent motor 3 and includes a stator having a core 17 of laminated material with any desired number of poles 17a, the core shown having four poles. A rotor 18 of any suitable kind is fixed to shaft 14 and rotates within the core and is spaced from the poles by an air gap 19. Windings 20, 21 are wound on the core and are provided with terminals 22, 23. Terminals 22 of windings 20 are adapted to be connected to an alternating current source (not shown) to energize the windings, and terminals 23 of windings 21 are adapted to be connected in a control circuit to provide a voltage corresponding to the speed of rotation of rotor 13 of motor 3.

Housing 1 has an annular shoulder 27 abutting core 17 of generator 5 and a sleeve 29 is received within the housing and one end of the sleeve engages the other side of core 17. The other end of sleeve 29 engages core 7 of motor 3. A cap 31 mounts bearing 15 and closes the end of housing 1 and abuts a sleeve 32 which engages the other side of core 7. Screws 33 or other suitable means secure cap 31 to the housing.

The arrangement described is known in the art and leakage flux from the end turns of excited windings 20 and fringe flux from the ends of air gap 19 induces a residual voltage in windings 21, when rotor 18 is at rest, with the disadvantages mentioned above.

To substantially eliminate the residual voltage induced in windings 21 when the rotor is at rest, the flux pattern is modified substantially uniformly about the poles by a cylindrical member 39 (Fig. 3) mounting bearing 16 and received in an aperture 41 in the end of housing 1 remote from cap 31. The member extends inwardly of the housing within windings 20, 21 and the inner edge 43 of the member has a series of uniform cut-out portions 45 equally spaced angularly from one another and corresponding in number to the number of poles on core 17. The inner edge 43 of member 39 is positioned adjacent to core 17 and near the end of air gap 19 between the rotor and poles. Member 39 is moved angularly about its axis relative to core 17 and windings 20, when rotor 25 is at rest, until the residual voltage induced in windings 21 is a minimum.

A plate 47 attached to housing 1 by screws 49 threaded into the housing engages an outwardly extending flange 51 on member 39 for securing member 39 to the housing after adjustment.

It has been found that there is an optimum axial position of the rotor relative to the stator for minimum residual voltage. The rotor can be adjusted axially relative to the stator by moving shims 52 from one end of shaft 14 between the housing and bearing to the opposite end of the shaft until the residual voltage is a minimum.

In Figs. 4 and 5 is shown a modification of the arrangement of Figs. 1 to 3 for modifying the flux pattern adjacent each of the poles uniformly to substantially eliminate residual voltage induced in windings 21 when the rotor is at rest. In Figs. 4 and 5 an end-plate 53 mounts bearing 16a and closes the end of housing 1a. A plurality of rods 57 equally spaced angularly from one another are mounted on end-plate 53 and extend close to and within windings 20a, 21a. One end of each rod is received in an aperture 59 in end-plate 53 and the other end of each rod is positioned adjacent to core 17a and air gap 19a between rotor 18a and core 17a. The number of rods corresponds to the number of poles on the core and the flux pattern is modified uniformly adjacent each pole to substantially eliminate residual voltage induced in windings 21a by rotating end plate 53 when the rotor is at rest, until the residual voltage is a minimum. The end-plate may be assembled to the housing and held against rotation in any suitable manner such as by a snap ring 55.

The arrangements described modify the flux pattern uniformly about each pole and substantially eliminate residual voltage when the rotor is at rest so that the generator is adapted especially for use in a computer of the kind described and in a servo system where the servo motor must be accurately returned to zero position.

Although only two embodiments of the invention have been illustrated and described in detail, it is to be expressly understood that the invention is not limited thereto. Various changes can be made in the design and arrangement of the parts without departing from the spirit and scope of the invention as the same will now be understood by those skilled in the art.

I claim:

1. A generator of the kind described including a stator having a core with a plurality of poles and windings thereon, a rotor rotatable relative to said stator, one of said windings being adapted for energization by an alternating current source for inducing a voltage in said other winding upon relative rotation of said rotor and stator, and a member of magnetically permeable material received within the cylindrical surface formed by the end turns of said windings and closely associated therewith, said member being positioned adjacent said core and having a series of flux modifying portions corresponding in number to the number of poles on said stator and arranged to modify the flux adjacent said poles, said member being oriented angularly relative to said stator to substantially eliminate residual voltages induced in said winding when said rotor is at rest.

2. A generator of the kind described in claim 1 including means to adjust the rotor axially relative to the stator to reduce residual voltage induced in the stator winding to a minimum.

3. A generator of the kind described including a stator having a core with a plurality of poles and windings thereon, a rotor rotatable relative to said stator, one of said windings being adapted for energization by an alternating current source for inducing a voltage in said other winding upon relative rotation of said rotor and stator, and means closely associated with the end turns of said windings and positioned adjacent said core and having a series of elements corresponding in number to the number of poles on said stator, said means being oriented angularly relative to said stator so that said elements uniformly modify end turn leakage flux from said energized winding and substantially eliminate residual voltages induced in said other winding when said rotor is at rest.

4. A generator of the kind described including a stator having a core with a plurality of poles and windings thereon, a rotor rotatable relative to said stator and closely associated with said poles and separated therefrom by an air gap, one of said windings being adapted for energization by an alternating current source for inducing a voltage in said other winding upon relative rotation of said rotor and stator, means received within the cylindrical surface formed by the end turns of said windings and having one end positioned adjacent said core and air gap and having a series of flux modifying portions corresponding in number to the number of poles on said stator, said means being oriented angularly relative to said stator so that said portions uniformly modify leakage flux from the end turns of said energized winding and fringe flux at the ends of said air gap to substantially eliminate residual voltages induced in said other winding when said rotor is at rest.

5. A generator of the kind described having a relatively rotatable rotor and stator, said stator having a core with a plurality of poles and having windings thereon, one of said windings being adapted for energization by an alternating current source for inducing a voltage in said other winding upon relative rotation of said rotor and stator, a member of magnetically permeable material received within the cylindrical surface formed by the end turns of said windings and having one edge closely associated with said core and having flux modifying portions adjacent said edge corresponding in number to the number of said poles, said member being positioned relative to said stator to modify end turn leakage flux from said energized winding to substantially eliminate residual voltages induced in said other winding when said rotor is at rest relative to said stator.

6. A generator of the kind described including a stator having a core with a plurality of poles and windings thereon, a rotor rotatable relative to said stator, one of said windings being adapted for energization by an alternating current source for inducing voltage in said other winding upon relative rotation of said rotor and stator, and a cylindrical member of magnetically permeable material having one of its ends positioned adjacent said core and having a series of uniformly distributed flux modifying portions thereon corresponding in number to the number of poles on said stator, said member being oriented angularly relative to said stator to substantially eliminate residual voltages induced in said winding when said rotor is at rest.

7. A generator of the kind described including a stator having a core with a plurality of poles and having windings thereon, a rotor rotatable relative to said stator and closely associated with said poles and separated therefrom by an air gap, one of said windings being adapted for energization by an alternating current source for inducing a voltage in said other winding upon relative rotation of said rotor and stator, a cylindrical member of magnetically permeable material received within the cylindrical surface formed by the end turns of said windings and having one edge positioned adjacent to said core and having a series of cut-out portions corresponding in number to the number of poles on said core, said member being positioned and arranged to modify the leakage flux from the end turns of said energized winding and the fringe flux at the end of the air gap uniformly about each pole to substantially eliminate residual voltages induced in said other winding when said rotor is at rest.

8. A generator of the kind described including a stator having a core with a plurality of poles and having windings thereon, a rotor rotatable relative to said stator and closely associated with said poles and forming an air gap therebetween, one of said windings being adapted for energization by an alternating current source for inducing a voltage in said other winding upon relative rotation of said rotor and stator, a cylindrical member of magnetically permeable material having one edge positioned adjacent the end of the air gap and having a series of cut-out portions corresponding in number to the number of poles on said core, said member being positioned and arranged to modify the leakage flux from the end turns of said energized winding and the fringe flux at the end of said air gap uniformly adjacent each pole to substantially eliminate residual voltages induced in said other winding when said rotor is at rest.

9. A generator of the kind described having a housing with an aperture in one end, a stator mounted within said housing and having a core with a plurality of poles and having windings thereon, a rotor rotatable relative to said stator and closely associated with said core, one of said windings being adapted for energization by an alternating current source for inducing a voltage in said other winding upon relative rotation of said rotor and stator, and a cylindrical member of magnetically permeable material received in said aperture and extending inwardly of said housing and having one edge positioned adjacent to said core and provided with a series of cut-out portions corresponding in number to the number of said poles, said member being angularly adjustable relative to said stator to modify the leakage flux from the end turns of said energized winding uniformly adjacent each of said poles to substantially eliminate residual voltages induced in said other winding when said rotor is at rest.

10. A generator of the kind described having a housing with an aperture therein, a stator mounted within said housing and including a core with a plurality of poles and having windings thereon, a rotor rotatable relative to said stator and closely associated with said poles and forming an air gap therebetween, one of said windings being adapted for energization by an alternating current source for inducing a voltage in said other winding upon relative rotation of said rotor and stator, and a cylindrical member of magnetically permeable material received in said aperture and extending inwardly of said housing and having one edge positioned adjacent the end of said air gap and having cut-out portions therein corresponding in number to the number of poles, said member being angularly adjustable relative to said stator to modify the leakage flux from the end turns of said energized winding uniformly adjacent each of said poles to substantially eliminate residual voltages induced in said other winding when said rotor is at rest.

11. A generator of the kind described having a housing with an aperture therein, a stator mounted within said housing and including a core with a plurality of poles and having windings thereon, a rotor closely associated with said core, one of said windings being adapted for energization by an alternating current source for inducing a voltage in said other winding upon relative rotation of said rotor and stator, bearings in said housing mounting said rotor for rotation relative to said stator, and a cylindrical member of magnetically permeable material received in said aperture and mounting one of said bearings and extending inwardly of said housing within the cylindrical surface formed by the end turns of said windings, one edge of said member being positioned adjacent to said core and being provided with a series of cut-out portions corresponding in number to the number of said poles, said member being angularly adjustable relative to said stator to modify the leakage flux from the end turns of said energized winding to substantially eliminate residual voltage induced in said other winding when said rotor is at rest.

12. A generator of the kind described including a stator having a core with a plurality of poles and having windings thereon, a rotor rotatable relative to said stator, one of said windings being adapted for energization by an alternating current source for inducing a voltage in said other winding upon relative rotation of said rotor and stator, and a plurality of elements of magnetically permeable material positioned close to said windings and adjacent to said core, said elements corresponding in number to the number of poles on said stator, and means for orienting said elements angularly relative to said stator to modify leakage flux from the end turns of said energized winding adjacent each pole to substantially eliminate residual voltages induced in said other winding when said rotor is at rest.

13. A generator of the kind described including a stator having a core with a plurality of poles and having windings thereon, a rotor rotatable relative to said stator and closely associated with said poles and separated therefrom by an air gap, one of said windings being adapted for energization by an alternating current source for inducing a voltage in said other winding upon relative rotation of said rotor and stator, a plurality of elements of magnetically permeable material angularly spaced equally from one another and received within the cylindrical surface formed by the end turns of said windings and positioned adjacent to said core, said elements corresponding in number to the number of poles on said stator, and means for orienting said element angularly relative to said stator to modify leakage flux from the end turns of said energized winding adjacent each pole and fringe flux at the end of the air gap to substantially eliminate residual voltages induced in said other winding when said rotor is at rest.

14. The method of reducing residual voltage in a rate generator of the kind described having a stator with windings thereon and a rotor rotatable relative thereto, comprising energizing one of said windings by an alternating current source, and adjusting the rotor axially while at rest relative to the stator until the residual voltage induced in the other winding is a minimum.

ALLEN W. BLANCHARD.

References Cited in the file of this patent

UNITED STATES PATENTS

| Number | Name | Date |
|---|---|---|
| 429,109 | Anderson | June 3, 1890 |
| 669,575 | Bliss | Mar. 12, 1901 |